United States Patent [19]

Rotello

[11] Patent Number: 4,600,300
[45] Date of Patent: Jul. 15, 1986

[54] METHOD AND APPARATUS TO DETERMINE FREQUENCY OF MOVEMENT AND FOR VISUAL INSPECTION OF MOVING OBJECTS

[76] Inventor: Gregory A. Rotello, Box 42, Cornwall Bridge, Conn. 06754

[21] Appl. No.: 466,298

[22] Filed: Feb. 14, 1983

[51] Int. Cl.⁴ .............................................. G01P 3/40
[52] U.S. Cl. ..................................................... 356/23
[58] Field of Search ............................. 356/23, 24, 25; 350/331 R, 332, 352; 324/78 R, 78 J, 78 Q

[56] References Cited

U.S. PATENT DOCUMENTS

| | | | |
|---|---|---|---|
| 2,127,605 | 8/1938 | Kucher et al. | 356/23 |
| 3,581,217 | 5/1971 | Isaacs | 324/78 J |
| 3,603,876 | 9/1971 | Grundy | 324/78 J |
| 3,615,136 | 10/1971 | Kamm | 356/25 |
| 3,624,410 | 11/1971 | Bruckert | 324/78 R |
| 3,844,650 | 10/1974 | Nicholson et al. | |
| 4,051,370 | 9/1977 | Bly | |
| 4,193,691 | 3/1980 | Fjarlie | |
| 4,272,195 | 6/1981 | Kaye | |
| 4,279,474 | 7/1981 | Belgorod | 350/331 R |

FOREIGN PATENT DOCUMENTS 56-24317  3/1981  Japan .

Primary Examiner—R. A. Rosenberger
Assistant Examiner—Crystal Cooper
Attorney, Agent, or Firm—Costas, Montgomery & Dorman

[57] ABSTRACT

Method and apparatus for determining the frequency of movement of an object or inspection of a moving object where a liquid crystal viewer is pulsed at a rate equal to the rate of movement of the object. Method and means are provided for obtaining a variable viewing window for each period of the pulsing means.

10 Claims, 11 Drawing Figures

METHOD AND APPARATUS TO DETERMINE FREQUENCY OF MOVEMENT AND FOR VISUAL INSPECTION OF MOVING OBJECTS

RELATED DOCUMENTS

This application discloses an invention which was the subject matter of disclosure documents Nos. 106181 and 106182, both filed Feb. 17, 1982.

FIELD OF THE INVENTION

This invention relates to a system and method for determining the rate of rotation or frequency of movement of an object and for visual inspection of moving or changing objects.

BACKGROUND OF THE INVENTION

Heretofore, the speed of rotation of an object or a frequency of oscillation has been determined by a stroboscope. A stroboscope, more commonly termed a "strobe", may emit pulses of light at variable frequencies which are synchronized with the speed of rotation of the object or frequency of oscillation. When the object appears stationary under illumination of the strobe, the speed of rotation or the frequency of oscillation may be determined from the frequency of illumination of the strobe and the object may be visually inspected.

However, this technique is subject to inherent limitation. Intensity of light on an object degrades as a function of the square of the distance from the light source. The stroboscopic effect on the object can be lost in an environment of high ambient light. In fact, the strobe effect may be lost on a light emitting object. These factors limit the environment of usage of a strobe and the distance from the object under investigation, where it may effectively be used. Also, most strobes depend on the charging of a capacitor, or an external source for frequency of illumination. Since capacitor charging time and the rise and decay time of light sources is finite, the speed of a strobe is limited.

Accordingly, the present invention provides a new and improved system and method for determining the frequency of movement and visual inspection of a moving or changing object where the distance from the object and/or the ambient lighting conditions present little or no problem. In fact, it is preferred that the ambient lighting be high, and it may be augmented dependent upon the distance of the viewer from the object. The invention may also be utilized to determine the frequency of energization of a light emitting source.

SUMMARY OF THE INVENTION

The invention utilizes a liquid crystal viewer to observe the object of interest. As used herein, the term "object" may refer to a rotating or vibrating device, a changing light source such as a point of light or a raster scan, or any device which changes position or observable state. A liquid crystal may be electrically pulsed to render it either transparent or opaque to light, depending upon the use of polarizers. The invention, in one form thereof, utilizes a variably controlled frequency pulse generator, whose output is is applied to a liquid crystal viewer to render the viewer transparent or opaque at the frequency of the oscillator. The viewer may take various forms, a plate viewer, goggles, glasses, viewers on binoculars, an element in front of a microscope viewing system of a camera, or fiber optics, etc.

A liquid crystal viewer, dependent on its initial polarization, may rotate the plane of polarization ninety degrees, and become opaque. Alternatively, polarizing sheets placed on either side of the device and oriented in the same plane, may make the device opaque when pulsed.

Additionally, the invention contemplates providing a variable duty factor for the period of the energizing pulses of the viewer to provide a variable time "window" for viewing.

An object of this invention is to provide a new and improved apparatus and method for determining the frequency change or movement of light source of an object, and/or visually inspecting moving parts.

Another object of this invention is to provide a new and improved apparatus and method for determining the rate of rotation or frequency of oscillation of an object using a liquid crystal viewer, including means to vary the viewing window during a period of energization of the liquid crystal viewer.

The features of the invention which are believed to be novel are particularly pointed out and distinctly claimed in the concluding portion of this specification. The invention, however, together with further objects and advantages thereof may best be appreciated by reference to the following detailed description taken in conjunction with the drawings.

DETAILED DESCRIPTION OF THE ILLUSTRATED EMBODIMENTS

Figures 1, 2:
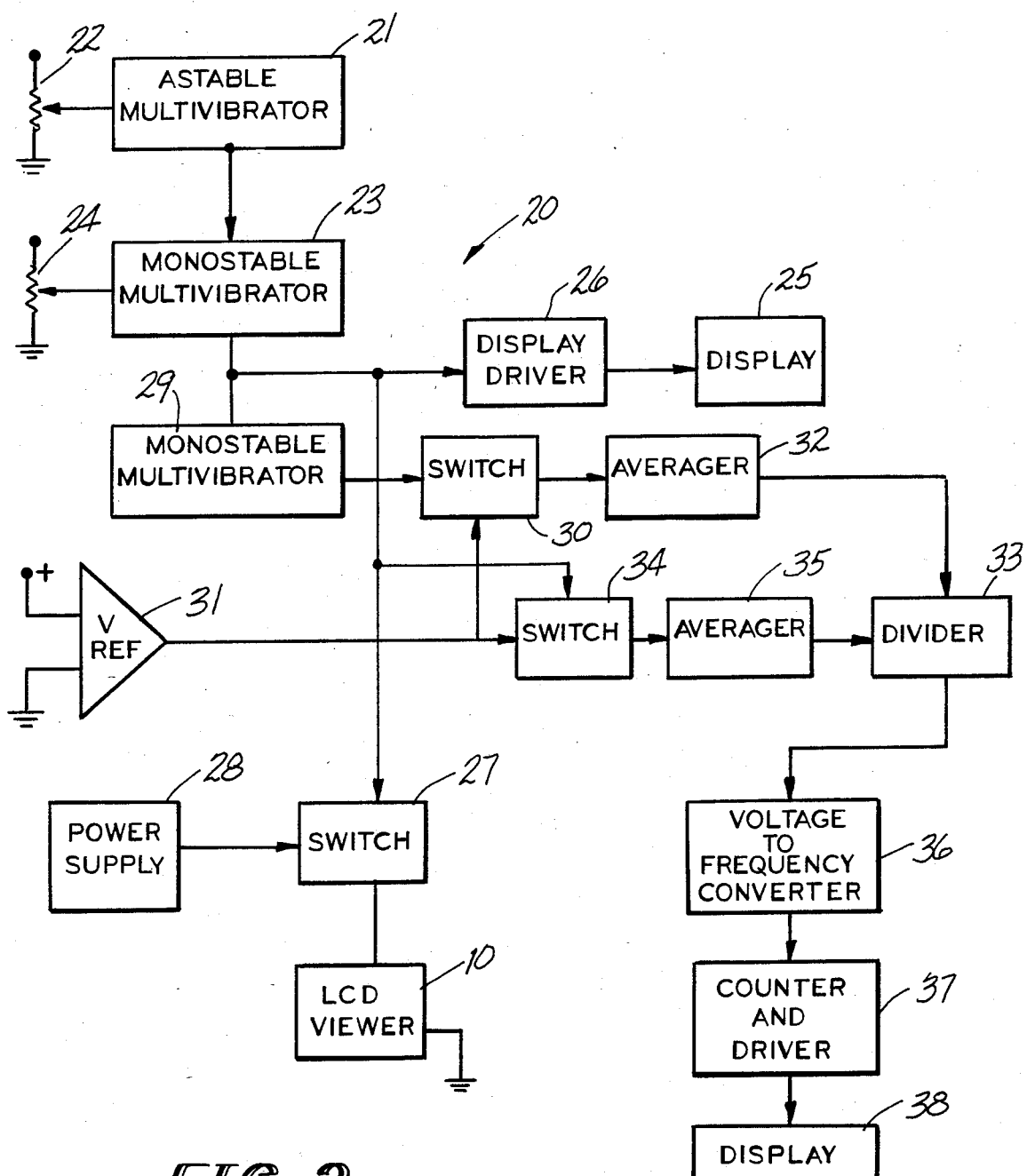
FIG. 1 is an edge view of a liquid crystal viewing apparatus utilized in the invention.
FIG. 2 is a block diagram of a network utilized in the invention.

A liquid crystal viewer which may be utilized in the invention is shown in longitudinal edge view in FIG. 1. This viewer 10 comprises a liquid crystal material 11 shown in heavy line between transparent plates 12 and 13. The plates may be suitably spaced and electrical leads 14 and 15 are in contact with the liquid crystal material.

A mixture of trans cyano, alkyl byphenyl homologues is one of the most widely used materials for liquid crystal displays. Another available material is a pure trans cyano, propyl phenyl cyclohexane. Another available material is a eutectic mixture of propyl, pentyl, and heptyl cyano phenyul cyclohexane.

The glass plates 12 and 13 are preferably polished to have high transmittance, low strain, and maximum flatness. The leads 14 and 15 may be connected to electrodes which extend perpendicular to the plane of FIG. 1.

The viewer 10 is sandwiched between a pair of polarizing sheets 16 and 17.

The mechanism by which light either passes or is blocked by the liquid crystal is well known. In brief, assuming a light source is above the device 10 of FIG. 1, the polarizer 16 horizontally polarizes the light entering the cell. Assuming the liquid crystal is in the unenergized state, the radiation passes through the liquid crystal layer 11, the second polarizer 17 being polarized in the same direction as the first, passes the radiation and the display appears uniformly transparent. When a voltage is applied across electrodes 14 and 15, the molecules of material 11 abandon their alignment surfaces, and align themselves with the electric field. The ninety degree twisted polarization is no longer applied and the device 10 becomes opaque, Viewer 10 is, as discussed herein, with the polarizing sheets is normally transparent, but when electrically pulsed, will become opaque (shutter) at a rate proportional to the pulse rate. At the present time, the viewer may be pulsed up to 3.5 megahertz. A viewer as described may be obtained from the American Liquid Xtal Chemical Corporation of Kent, Ohio.

If the object is illuminated with polarized light, then only one polarizing sheet is required on the viewing side of the viewer.

Figure 3:
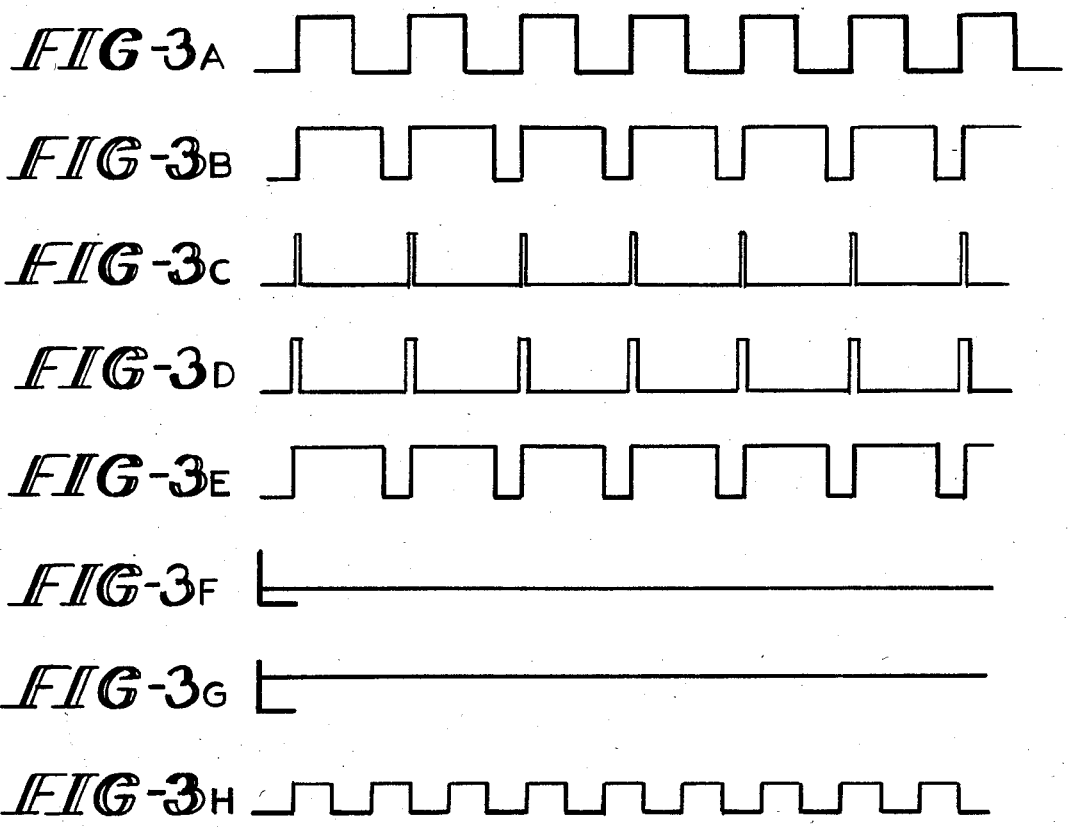
FIGS. 3a-3h are wave forms appearing in the network of FIG. 2.

Reference is now made to FIG. 2 and FIGS. 3a–3g. A system 20 which may be utilized in the invention, comprises a square wave generator which may be in the form of a free running or astable multivibrator 21. The frequency of generator 21 may be varied by an operator as exemplified by a potentiometer 22. The output wave form of multivibrator 21 is shown in FIG. 3a and is essentially a symmetrical square wave. This wave form is applied to a monostable multivibrator 23 and is converted to a wave form having a variable duty factor. Multivibrator 23 will provide a square wave of variable duration (FIG. 3b) during a period of the output of multivibrator 21. The duty factor of the square wave exemplified as the positive portion in FIG. 3b is adjustable by the operator as by means of a potentiometer 24.

The frequency of multivibrator 23 and hence, multivibrator 21, will be shown on a display 25 which is driven by a frequency counter and display driver identified as display driver 26, hereinafter more specifically identified as to type. Display 25 may be in the form of light emitting diodes (LED), or liquid crystal displays (LCD).

Thus, the operator may observe the frequency of multivibrator 21 by observing display 25. The duty factor of the monostable multivibrator 23 is variable in time to permit the operator to create a time window for viewing within a period of the frequency of oscillation. The output of multivibrator 23 is also applied to a transistor switch 27 which may be a simple transistor switch actuated by the positive going wave form of multivibrator 23. When switch 27 is closed, it will permit a power supply or source of voltage 28 to pulse the liquid crystal viewer 10.

In this manner, viewer 10 may be pulsed at a rate selected by the operator and will become transparent at that rate; and also during each period of that rate, it may have a transparent window of variable time. The rate will be determined by operator control of multivibrator 21 while the window time will be determined by operator control of multivibrator 23.

The invention further provides means for the operator to monitor the window time of viewing. A second monostable multivibrator 29 shown as driven by multivibrator 23, but which may also be driven by the free running multivibrator 21, generates a narrow pulse as shown in FIG. 3c. The pulses of multivibrator 29, as shown in FIG. 3c, are applied to a switch 30 which receives a voltage from a voltage reference source 31. Switch 30 provides output pulses shown in FIG. 3d, that is, pulses of fixed duration and a height determined by the reference voltage. The pulse train of FIG. 3d is then indicative of the frequency of generator 21. The wave form of FIG. 3d is applied to a voltage averager 32 which yields an output analog voltage as shown in FIG. 3f. This voltage is then applied to an analog voltage divider circuit 33.

Another switch 34 receives as an input the reference voltage from voltage reference source 31 and the wave form of FIG. 3b from monostable multivibrator 23. The output of switch 34 will then be a wave form as shown in FIG. 3e of fixed amplitude determined by the reference voltage source and of a width determined by monostable multivibrator 23. The wave form of FIG. 3e is then applied to a voltage averager 35 which provides an analog voltage as shown in FIG. 3g.

The analog voltages shown in FIGS. 3f and 3g are applied to a divider circuit and one is divided by the other to generate a voltage indicative of frequency/duty factor or vice versa. This quotient voltage is applied to a voltage to frequency converter 36 which provides a frequency proportional to the quotient voltage as shown in FIG. 3h. The signal of FIG. 3h is then applied to a counter and display driver 37 which provides a signal to a visual display 38. Display 38 will then provide a display indicative of the ratio of the frequency to the duty factor or vice versa. Display 38 may be LED or LCD.

In operation, the operator will view a rotating or oscillating object through viewer 10, and adjust generator 21 until the object appears stationary. Then the rate of movement will be read from display 25 and/or the object may be visually inspected.

The operator may vary the viewing window of each period of the output of generator 21 by varying the duty factor of the output of multivibrator 23.

Listed below is a table of suggested window duration (time) for objects rotating, vibrating or changing state at given speeds:

| Revolutions/Second | Window Transparency |
| --- | --- |
| 1 | 1/360 second |
| 10 | 1/3,600 second |
| 100 | 1/36,000 second |
| 1,000 | 1/360,000 second |
| 10,000 | 1/3,600,000 second |

The foregoing is based on the premise that a visual drift of one degree of arc during each window duration may be acceptable in terms of visual viewing resolution. Using the foregoing, the windows would always pass the same amount of light on a second to second basis regardless of the revolution per second speed of the device. The higher the level of ambient light, the lesser is the window duration required to view the object.

While the network of FIG. 2 may be easily implemented by one skilled in the art, a list of components is set forth below:

| Component | Part No. | Manufacturer |
| --- | --- | --- |
| Astable Multivibrator 21 | SE555 | National Semiconductor |
| Monostable Multivibrators 23, 29 | NM74C221 | National Semiconductor |
| Display Counter and Driver 26, 37 | 74C925 14492 | National Semiconductor National Semiconductor |
| Switch 30, 34 | CO4066 | National Semiconductor |
| Voltage Reference 31 | UM201 | National Semiconductor |
| Voltage to Frequency | VFC-321 | National Semiconductor |

| Component | Part No. | Manufacturer |
|---|---|---|
| Converter 34 | | |

Figure 4:
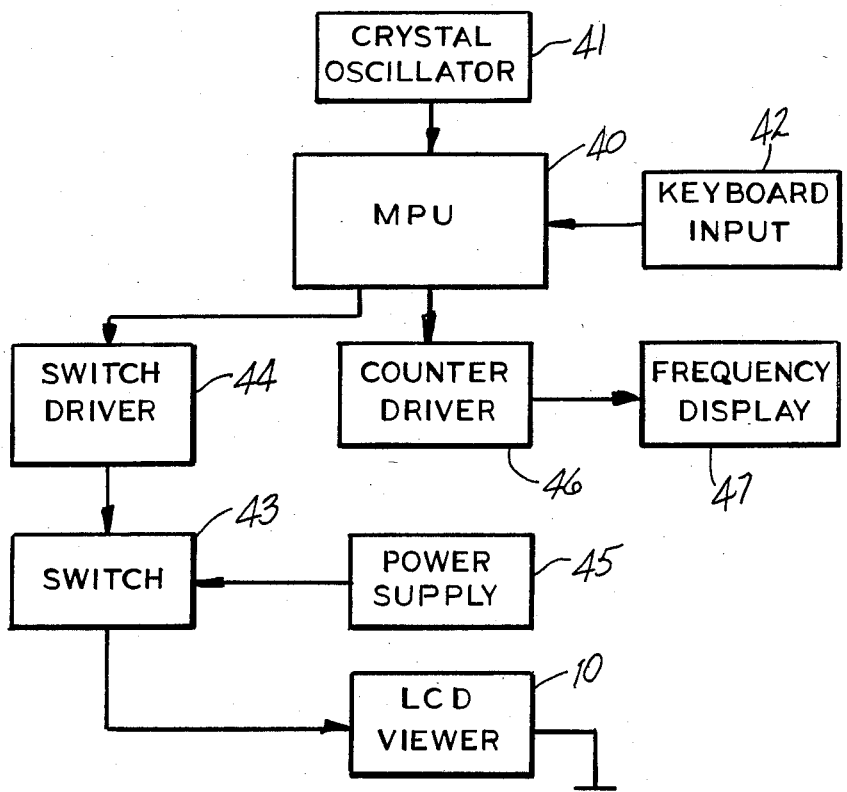
FIG. 4 is a block diagram of a network exemplifying a manner in which the invention may be implemented using a microprocessor.

The invention may also be embodied in a microprocessor based network as exemplified in FIG. 4. A microprocessor (MPU) 40 receives an input from a crystal oscillator 41. The microprocessor 40 may receive instructions from a keyboard type device 42 to enter commands for frequency and window length (duty factor). The microprocessor will supply signals to switch 43, through a driver 44, to pulse a viewer 10 from power supply 45. Coupled to microprocessor 40 is a counter and display driver 46, and frequency display 47 to indicate the frequency output of the microprocessor. In this embodiment, the microprocessor, which may be a Motorola MC141099, embodies the functions of the multivibrators of FIG. 2 as well as the reference voltage source.

While the invention has primarily been disclosed in the environment of viewing an oscillatory, rotating object or cyclically light emitting object, it may also be used to monitor a non-cyclical object. The viewer may be pulsed in accordance with a programmed rate to observe and inspect a non-cyclical moving object. In such case, the pulsing rate would be programmed for the movement to be inspected.

It may thus be seen that the objects of the invention set forth, as well as those made apparent from the foregoing description, are efficiently attained. While a preferred embodiment of the invention has been set forth for purposes of disclosure, modification to the disclosed embodiment as well as other embodiments thereof may occur to those skilled in the art. Accordingly, the appended claims are intended to cover all embodiments of the invention and modifications to the disclosed embodiment which do not depart from the spirit and scope of the invention.

Having thus described the invention, what is claimed is:

1. Apparatus for determining the frequency of movement or change of an object comprising a liquid crystal viewing device for observing the object, a variable frequency pulse generator providing a square wave having a symmetrical period, a second pulse generator responsive to said variable frequency pulse generator for providing a rectangular wave signal of the same frequency as said variable frequency pulse generator, but having a variable duty factor output coupled to said viewing device for rendering said viewing device transparent at the frequency of said second pulse generator, and means response to said second pulse generator for indicating the frequency of said pulse generators.

2. The apparatus of claim 1 further including means for varying the duty factor of said second pulse generator.

3. The apparatus of claim 1 further including means for indicating the duty factor of said second pulse generator as a function of the frequency of the output of said second pulse generator.

4. The apparatus of claim 3, where said second pulse generator is a first monostable multivibrator, a seond monostable multivibrator coupled to receive the output of one of said pulse generator and said first monostable multivibrator and provide pulses at a reference magnitude and relatively short duration at a frequency equal to the frequency of said pulse generator, said means for indicating the duty factor comprising means responsive to said pulses of relatively short duration for providing a first DC voltage representative of the frequency of said pulse generator, means responsive to the output of said first monostable multivibrator for providing a second DC voltage representative of the duty factor of said first monostable multivibrator, and means for comparing said DC voltages.

5. A method of determining the frequency of movement or change of an object, comprising the steps of providing a liquid crystal viewing device to observe the object, providing a variable frequency pulse generator, varying the duty factor of the output signal of said pulse generator, utilizing said varying duty factor signal to pulse said viewing device, viewing the object through the liquid crystal device as it is pulsed, varying the frequency of the generator until the object appears stationary through said viewing device, and determining the frequency of the pulses applied to said viewing device.

6. The method of claim 5 further including the step of providing an indication of the duty factor of the pulse signal applied to said viewing device.

7. A method of inspecting a moving object, comprising the steps of providing a liquid crystal viewing device to observe the object, providing a variable frequency pulse generator providing means responsive to said pulse generator for providing a rectangular wave pulse signal of the same frequency as said pulse generator and having a selectably variable duty factor, pulsing the liquid crystal device with said pulses of selectably variable duty factor in accordance with desired movement or change in the object such that the object appears stationary through said liquid crystal device, and viewing the object through said liquid crystal device.

8. The method of claim 6 further including the step of providing an indication of the duty factor of the rectangular wave pulse signal applied to said viewing device.

9. Apparatus to determine the frequency of movement or change of an object comprising a liquid crystal viewing device for observing the object, a pulse generating means for generating pulses at a selected frequency and at a variably selected duty factor at the selected frequency, means for selecting the frequency and the duty factor, means for applying said variably selected duty factor pulses to said viewing device, and means responsive to said pulse generating means for indicating a frequency of the pulses applied to said viewing device.

10. The apparatus of claim 9 further including means responsive to said pulse generating means for indicating the duty factor of the signal applied to said viewing device.

* * * * *